United States Patent
Xu

(10) Patent No.: US 11,050,661 B2
(45) Date of Patent: Jun. 29, 2021

(54) CREATING AN AGGREGATION GROUP

(71) Applicant: New H3C Technologies Co., Ltd., Zhejiang (CN)

(72) Inventor: Zhihui Xu, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 16/633,564

(22) PCT Filed: Jul. 24, 2018

(86) PCT No.: PCT/CN2018/096754
§ 371 (c)(1),
(2) Date: Jan. 23, 2020

(87) PCT Pub. No.: WO2019/019991
PCT Pub. Date: Jan. 31, 2019

(65) Prior Publication Data
US 2020/0162368 A1   May 21, 2020

(30) Foreign Application Priority Data
Jul. 24, 2017 (CN) .......................... 201710607814.5

(51) Int. Cl.
*H04L 12/709* (2013.01)
*H04L 12/46* (2006.01)
(Continued)

(52) U.S. Cl.
CPC .......... *H04L 45/245* (2013.01); *H04L 12/462* (2013.01); *H04L 45/02* (2013.01);
(Continued)

(58) Field of Classification Search
CPC ..... H04L 45/245; H04L 12/462; H04L 45/02; H04L 61/20; H04L 69/324; H04L 61/6022
(Continued)

(56) References Cited

U.S. PATENT DOCUMENTS

2009/0109848 A1 * 4/2009 Hato ................... H04L 45/32
370/235
2012/0287930 A1 * 11/2012 Raman ................ H04L 45/02
370/392
(Continued)

FOREIGN PATENT DOCUMENTS

| CN | 103780480 A | 5/2014 |
|---|---|---|
| CN | 105847107 A | 8/2016 |
| CN | 105991445 A | 10/2016 |
| EP | 2215815 B1 | 10/2013 |
| JP | 2014519249 A | 8/2014 |
| WO | 2017167275 A1 | 10/2017 |

OTHER PUBLICATIONS

ISA State Intellectual Property Office of the People's Republic of China, International Search Report Issued in Application No. PCT/CN2018/096754, dated Oct. 12, 2018, WIPO, 4 pages.
(Continued)

*Primary Examiner* — Obaidul Huq
(74) *Attorney, Agent, or Firm* — McCoy Russell LLP

(57) ABSTRACT

When a CB device receives through a first port a packet sent from a PE device, the CB device analyzes a unique identifier of the PE device from the packet. If the first port is not included in any of aggregation groups, an array table is queried. If the unique identifier of the PE device does not exist in the array table, an idle first aggregation group identifier is selected, a first aggregation group corresponding to the first aggregation group identifier is created, the first port is added to the first aggregation group, and a corre-
(Continued)

spondence between the first aggregation group identifier and the unique identifier of the PE device is recorded in the array table.

12 Claims, 3 Drawing Sheets

(51) Int. Cl.
    *H04L 12/751*     (2013.01)
    *H04L 29/12*     (2006.01)
    *H04L 29/08*     (2006.01)

(52) U.S. Cl.
    CPC ............ *H04L 61/20* (2013.01); *H04L 69/324* (2013.01); *H04L 61/6022* (2013.01)

(58) Field of Classification Search
    USPC ........................................ 370/351, 389, 392
    See application file for complete search history.

(56) References Cited

U.S. PATENT DOCUMENTS

| | | | |
|---|---|---|---|
| 2013/0322457 A1* | 12/2013 | Budhia | H04L 12/4625 370/401 |
| 2016/0065463 A1* | 3/2016 | Wang | H04L 49/70 370/392 |
| 2016/0205019 A1 | 7/2016 | Sundaram et al. | |
| 2017/0085488 A1 | 3/2017 | Bhattacharya et al. | |
| 2017/0111296 A1 | 4/2017 | Agarwal et al. | |
| 2018/0063035 A1 | 3/2018 | Lin | |

OTHER PUBLICATIONS

State Intellectual Property Office of the People's Republic of China, Office Action and Search Report Issued in Application No. 201710607814.5, dated Apr. 2, 2019, 9 pages. (Submitted with Partial Translation).

* cited by examiner

CREATING AN AGGREGATION GROUP

CROSS REFERENCE TO RELATED APPLICATION

The present application is a U.S. National Phase of International Application No. PCT/CN2018/096754, entitled "CREATION OF AGGREGATION GROUP", and filed on Jul. 24, 2018. International Application No. PCT/CN2018/096754 claims priority to Chinese Patent Application No. 201710607814.5 entitled "METHOD AND APPARATUS FOR CREATING AGGREGATION GROUP" and filed on Jul. 24, 2017. The entire contents of each of the above-listed applications are incorporated herein by reference for all purposes.

BACKGROUND

IRF (Intelligent Resilient Framework) is a vertical network integration virtualization technology that can be used to integrate hardware resources and software processing capabilities of multiple devices to achieve coordinated work, unified management, and ongoing maintenance of multiple devices. The IRF may connect multiple PE (Port Extender) devices to a CB (Controlling Bridge) device, and virtualize each of the PE devices into a remote service board of the CB device so that the CB device may centrally manage the multiple CB devices.

To improve the link stability between a CB device and a PE device, multiple links may be established between the CB device and the PE device. The multiple links form an aggregation link for transmitting packets. For management of the aggregation link, a user needs to manually create an aggregation group for the PE device on the CB device and add ports connected to the PE device to the aggregation group. However, since the creating of the aggregation group and the addition of ports are performed manually, the workload is large, especially when the CB device is connected to a large number of PE devices.

DETAILED DESCRIPTION OF THE EMBODIMENTS

The terms used in examples of this disclosure are for the purpose of describing the specific examples, not intended to limit this disclosure. The "one", "said" and "the" in a singular form intend to include a plural form, unless stated specifically in the context. It should also be understood that the term "and/or" indicates one or multiple associated listed items or any of the combination thereof.

It is to be understood that although different information may be described using the terms such as first, second, and third in examples of the present disclosure, this information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Figure 1:
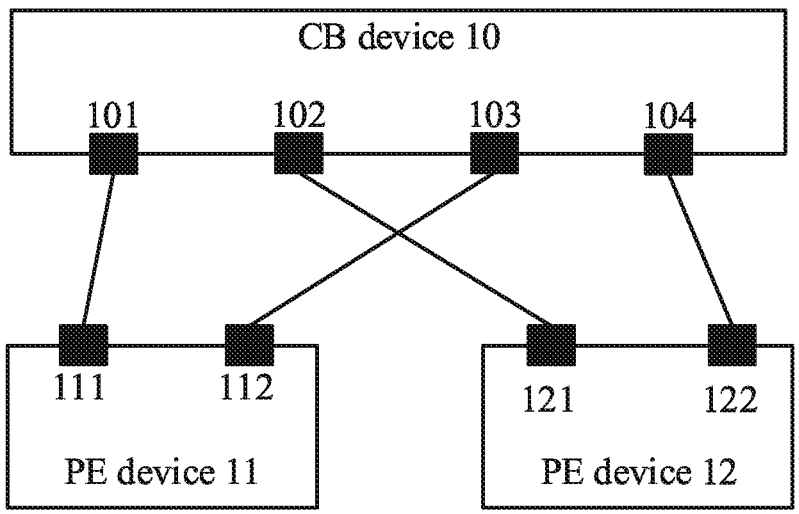
FIG. 1 is a schematic diagram of an application scenario according to an example of this disclosure.

The examples of this disclosure provide a method for creating an aggregation group, which can be applied to a system including a CB device and PE devices. In order to improve the link stability between the CB device and the PE device, two or more links may be established between the CB device and the PE device. Hereinafter, for convenience of description, two links are established is taken as an example for description. FIG. 1 shows an application scenario according to an example of this disclosure. The CB device 10 may connect the PE device 11 via two links, and connect PE device 12 also via two links. The port 101 of the CB device 10 is connected to the port 111 of the PE device 11, the port 103 of the CB device 10 is connected to the port 112 of the PE device 11, and the port 102 of the CB device 10 is connected to the port 121 of the PE device 12, and the port 104 of the CB device 10 is connected to the port 122 of the PE device 12.

Figure 2A:
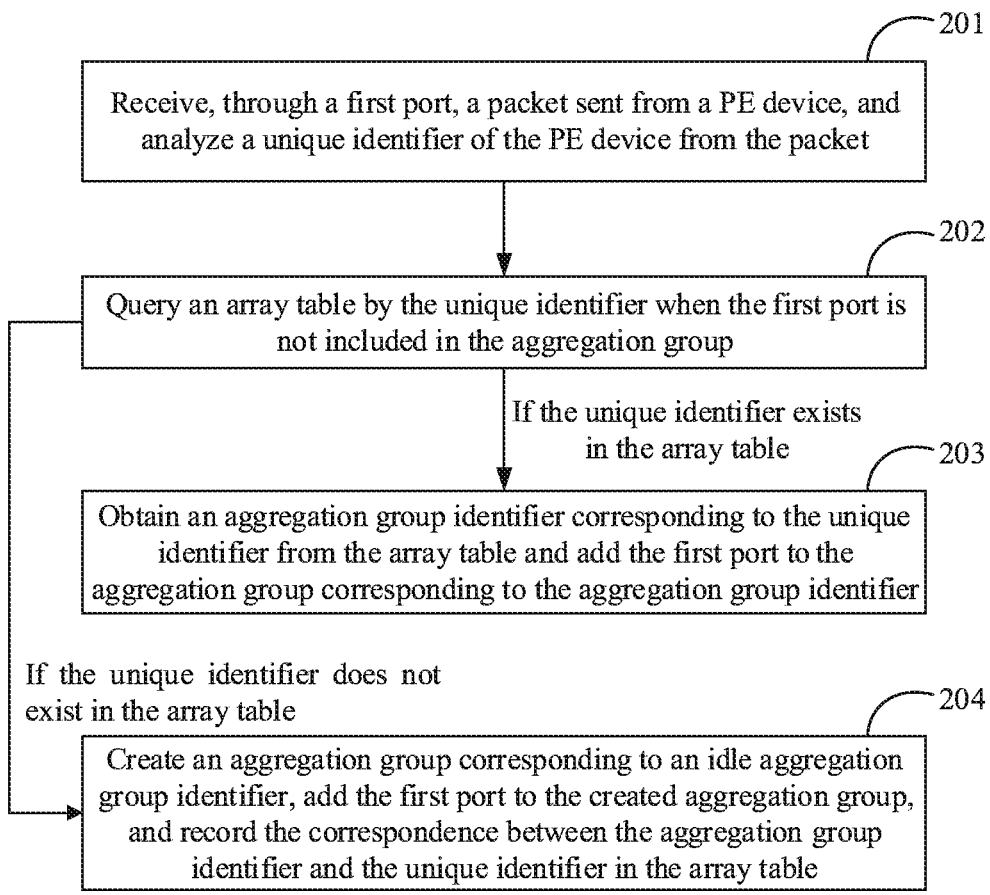
FIG. 2A is a flowchart of a method for creating an aggregation group according to an example of this disclosure.

FIG. 2A is a flowchart illustrating a method of creating an aggregation group according to an example of this disclosure, which may be applied to a CB device. The method may include the following blocks.

At block 201, the CB device may receive, through a first port, a packet sent from the PE device, and analyze a unique identifier of the PE device from the packet. The packet may include, but is not limited to, an LLDP (Link Layer Discovery Protocol) packet.

In an example, when receiving a packet through the first port, the CB device may analyze a device type field from the packet. When the device type field is a preset value, the CB device may determine that the packet received through the first port is sent from the PE device, and then execute the subsequent blocks. Moreover, when the device type field is not the preset value, the CB device may determine that the packet received through the first port is not sent from the PE device, and then ends the process.

Below, an LLDP packet is taken as an example to make description for the above process. The LLDP packet may include a device type field and a unique identifier field, and of course, other fields may be also included. In examples of this disclosure, other content included in the LLDP packet are not limited.

For example, when a PE device is connected to a CB device, the PE device may send an LLDP packet to the CB device. Assume that the device type field carried in the LLDP packet is a preset value, and it indicates that the type of the device that sends the LLDP packet is a PE device. The unique identifier field carried in the LLDP packet is a unique identifier of the PE device. In addition, the CB device can also send an LLDP packet to the PE device. In this case, the device type field carried in the LLDP packet will not be the preset value. The value other than the preset value may be referred to as a first value in order to be distinguished from the preset value, and the first value indicates that the device type is a CB device, and the unique identifier field carried in the LLDP packet is a unique identifier of the CB device.

The device type field may be a CPP (Cascade Port Priority) field. In an example, the value of the CPP field may range from 0 to 255. In order to distinguish whether the sender of the packet is a PE device or a CB device by the CPP field, one or more values within 0-255 may be used as a preset value to indicate that the device type is a PE device, and remaining values other than the preset value are the first values to indicate that the device type is a CB device. For example, 255 may be used as the preset value, and 0-254 may be used as the first value.

Based on this, when the CB device receives the LLDP packet through the first port, if the device type field of the LLDP packet is 255, it indicates that the LLDP packet is sent from the PE device, that is, the CB device receives, through the first port, the LLDP packet sent from the PE device. If the device type field of the LLDP packet is any value within 0 to 254, it indicates that the LLDP packet is sent from the CB device, that is, the CB device receives through the first port the LLDP packet sent from another CB device.

The unique identifier field may be an Address field, which is used to carry a unique identifier of the device, and the unique identifier may include, but is not limited to, a MAC (Media Access Control) address of the device. Based on this, when receiving through the first port the LLDP packet sent by the PE device, the CB device can obtain the MAC address of the PE device by analyzing the unique identifier field.

At block 202, the CB device may query an array table when the first port is not included in any of aggregation groups. If the unique identifier of the PE device exists in the array table, block 203 may be performed; if the unique identifier of the PE device does not exist in the array table, block 204 may be performed.

In an example, the CB device may create an array table for recording the correspondence between the identifier of the aggregation group (referred to aggregation group identifier) and the unique identifiers of the PE devices. Table 1 shows an example of an array table. As shown in Table 1, the initial state of the array table is empty. In the subsequent process, the CB device will add the aggregation group identifier and the unique identifiers of the PE devices to the array table.

TABLE 1

| Aggregation group ID | Unique identifier of PE device |
|---|---|
| ... | ... |

In an example, after receiving through the first port the packet sent from the PE device, the CB device may analyze the unique identifier of the PE device from the packet, and then determines whether the first port is included in the aggregation group. If the first port is included in the aggregation group (referred to as the second aggregation group), the CB device may query the array table by the identifier of the second aggregation group (referred to as the second aggregation group identifier); if the unique identifier of the PE device corresponding to the second aggregation group identifier recorded in the array table is different from the unique identifier of the PE device that is analyzed from the packet, the CB device may update the unique identifier of the PE device corresponding to the second aggregation group identifier into the analyzed unique identifier in the array table, and ends the process. If the unique identifier of the PE device corresponding to the second aggregation group identifier recorded in the array table is the same as the unique identifier of the PE device that is analyzed from the packet, the process may be terminated. If the first port is not included in the aggregation group, the array table may be queried by the unique identifier of the PE device analyzed from the packet.

At block 203, if the unique identifier of the PE device exists in the array table, the CB device may obtain an aggregation group identifier (recorded as the third aggregation group identifier) corresponding to the unique identifier of the PE device from the array table, and add the first port to the third aggregation group corresponding to the third aggregation group identifier. In this way, the first port can be successfully added to the aggregation group.

The array table is used to record the correspondence between the aggregation group identifier and the unique identifier of the PE device. Therefore, when the unique identifier of the PE device exists in the array table, the CB device may obtain the aggregation group identifier corresponding to the unique identifier from the array table, and add the first port into the aggregation group corresponding to the aggregation group identifier.

At block 204, if the unique identifier of the PE device does not exist in the array table, the CB device may select an idle (that is, unused) aggregation group identifier (recorded as the first aggregation group identifier), and create a first aggregation group corresponding to the first aggregation group identifier; add the first port to the created first aggregation group, and record the correspondence between the first aggregation group identifier and the unique identifier of the PE device analyzed in block 202 in the array table.

In an example, after the first aggregation group is created, the CB device may also select an idle (i.e., unused) PE number and assign the selected PE number to the PE device. The PE number is used as the frame number of the PE device, and is the identifier of the PE device managed by the CB device. Then, the CB device may also record the correspondence between the selected PE number and the first aggregation group identifier.

It should be noted that the foregoing first aggregation group, the first aggregation group identifier, the second aggregation group, the second aggregation group identifier, the third aggregation group, and the third aggregation group identifier are only distinguished for convenience of description, not intending to indicate different aggregation groups. In actual, the first aggregation group, the second aggregation group, and the third aggregation group may be the same aggregation group or different aggregation groups.

In an example, the CB device may create an aggregation group for each PE device, including: creating an aggregation group for the PE device, assigning an aggregation group identifier to the aggregation group, adding a port to the aggregation group, and assigning a PE number to the PE device corresponding to the aggregation group.

To achieve "assigning an aggregation group identifier to an aggregation group", multiple aggregation group identifiers may be configured on the CB device, such as the aggregation group identifier 1—the aggregation group identifier 1024. In the initial state, these aggregation group identifiers are idle. When an aggregation group identifier is assigned to an aggregation group, the aggregation group identifier is marked as a non-idle aggregation group identifier, and is no longer assigned to other aggregation groups.

To achieve "selecting an idle PE number and assigning the selected PE number to the PE device", multiple PE numbers may be configured on the CB device, such as PE number 100-PE number 128. In the initial state, these PE numbers are idle. When a PE number is assigned to a PE device, the PE number is marked as a non-idle PE number, and is no longer assigned to other PE devices.

Figure 2B:
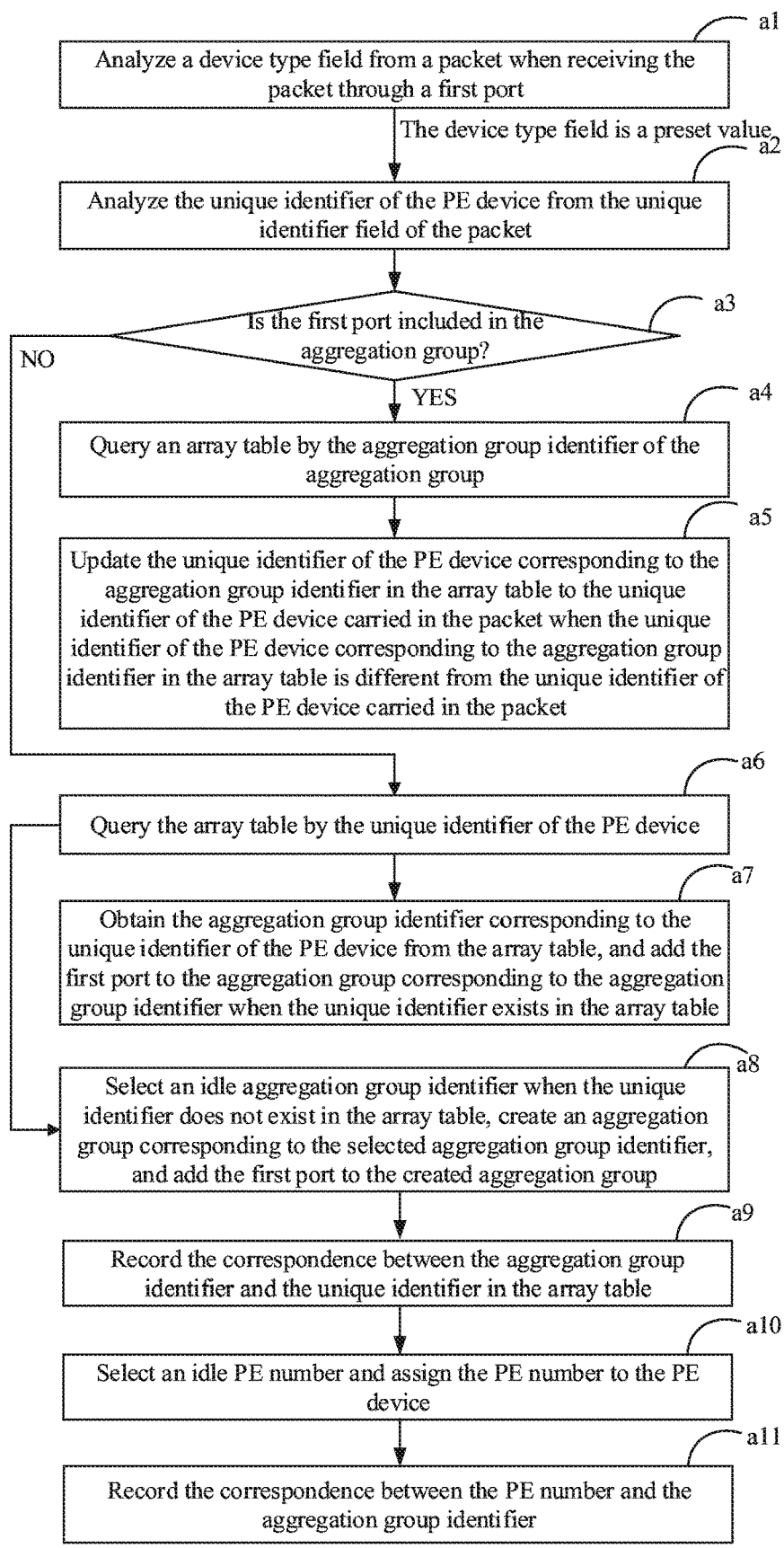
FIG. 2B is a schematic flowchart of a method for creating an aggregation group according to an example of this disclosure.

The above method for creating the aggregation group will be described in detail below in conjunction with a specific example. The creation process of the aggregation group can be as shown in FIG. 2B.

At block a1, when receiving a packet (LLDP packet) through a first port, the CB device analyzes a device type field from the packet. When the device type field is a preset value, block a2 is performed; when the device type field is not a preset value, it is determined that the packet received through the first port is sent from a non-PE device, and the process ends.

At block a2, the CB device determines that the packet received through the first port is sent from the PE device, and analyzes the unique identifier of the PE device, such as the MAC address of the PE device, from the unique identifier field of the packet.

At block a3, the CB device determines whether the first port is included in an aggregation group.

If yes, block a4 may be performed, and if not, block a6 may be performed.

At block a4, the CB device queries the array table by the aggregation group identifier of the aggregation group, and determines whether the unique identifier of the PE device corresponding to the aggregation group identifier in the array table is the same as the unique identifier of the PE device carried in the packet. If yes, the process ends, and if not, block a5 may be performed.

At block a5, the CB device updates the unique identifier of the PE device corresponding to the aggregation group identifier in the array table to the unique identifier of the PE device carried in the packet. After block a5, the flow can be terminated.

At block a6, the CB device queries the array table by the unique identifier of the PE device, and determines whether the unique identifier exists in the array table. If yes, block a7 may be performed; if no, block a8 may be performed.

At block a7, the CB device obtains the aggregation group identifier corresponding to the unique identifier of the PE device from the array table, and adds the first port to the aggregation group corresponding to the aggregation group identifier, and then ends the process.

At block a8, the CB device selects an idle aggregation group identifier, creates an aggregation group corresponding to the selected aggregation group identifier, and adds the first port to the created aggregation group. Then, block a9 is performed.

At block a9, the CB device records the correspondence between the aggregation group identifier and the unique identifier in the array table.

At block a10, the CB device selects an idle PE number and assigns the PE number to the PE device.

At block a11, the CB device records the correspondence between the PE number and the aggregation group identifier, and ends the process.

Based on the foregoing technical solution, in the examples of this disclosure, the CB device may automatically create an aggregation group, assign an idle aggregation group identifier to the aggregation group, and add the port connected to the PE device to the aggregation group instead of manually creating an aggregation group and adding the port to the aggregation group by a user. Therefore, the workload of the manual configuration by the user can be reduced. In particular, when a CB device is connected to a large number of PE devices, the workload of the user can be significantly reduced. The CB device can quickly create an aggregation group to achieve automatic deployment of PE devices. The CB device can also automatically assign a PE number to the PE device, so that the PE device can automatically go online.

The foregoing method of creating the aggregation group will be described in detail below with reference to the application scenario shown in FIG. 1.

Assume that the PE device 11 sends an LLDP packet through the port 111, where the LLDP packet carries the MAC address A of the PE device 11. After the CB device 10 receives the LLDP packet through the port 101, since the port 101 is not included in the aggregation group, the CB device 10 queries the array table by the MAC address A. Since the MAC address A does not exist in the array table, the CB device 10 selects an idle aggregation group identifier such as the aggregation group identifier 1, and creates an aggregation group corresponding to the aggregation group identifier 1 (hereinafter referred to as aggregation group 1). Then, the CB device 10 adds the port 101 to the aggregation group 1, and records the correspondence between the aggregation group identifier 1 and the MAC address A in the array table, as shown in Table 2. Then, the CB device 10 selects an idle PE number such as the PE number 100, and assigns the PE number 100 to the PE device 11, and records the correspondence between the PE number 100 and the aggregation group identifier 1.

TABLE 2

| Aggregation group identifier | Unique identifier of the PE device |
| --- | --- |
| Aggregation group identifier 1 | MAC address A |
| ... | ... |

Then, the PE device 11 sends an LLDP packet through the port 112, where the LLDP packet carries the MAC address A of the PE device 11. After the CB device 10 receives the LLDP packet through the port 103, since the port 103 is not included in the aggregation group, the CB device 10 queries the array table by the MAC address A. Since the MAC address A exists in the array table, the CB device 10 obtains the aggregation group identifier 1 corresponding to the MAC address A from the array table, and adds the port 103 to the aggregation group 1 corresponding to the aggregation group identifier 1.

Until now, the CB device 10 automatically completes the aggregation of port 101 and port 103. The CB device 10 creates an aggregation group 1, assigns an aggregation group identifier 1 to the aggregation group 1, adds port 101 and port 103 to the aggregation group 1, and assigns the PE number 100 to the PE device 11 corresponding to the aggregation group 1. After that, if the CB device 10 receives a new LLDP packet through the port 101 or the port 103 again, since the port 101/port 103 has been already included in the aggregation group, the CB device 10 will not start the operation of creating and updating the aggregation group based on the new LLDP packet.

Similarly, when the CB device 10 receives an LLDP packet through the port 102/port 104, the process is similar to the foregoing process, and details thereof will not be described herein Finally, the CB device 10 may create the aggregation group 2, assign the aggregation group identifier 2 to the aggregation group 2, add the port 102 and the port 104 to the aggregation group 2, and assign the PE number 101 to the PE device 12 corresponding to the aggregation group 2.

Figure 3:
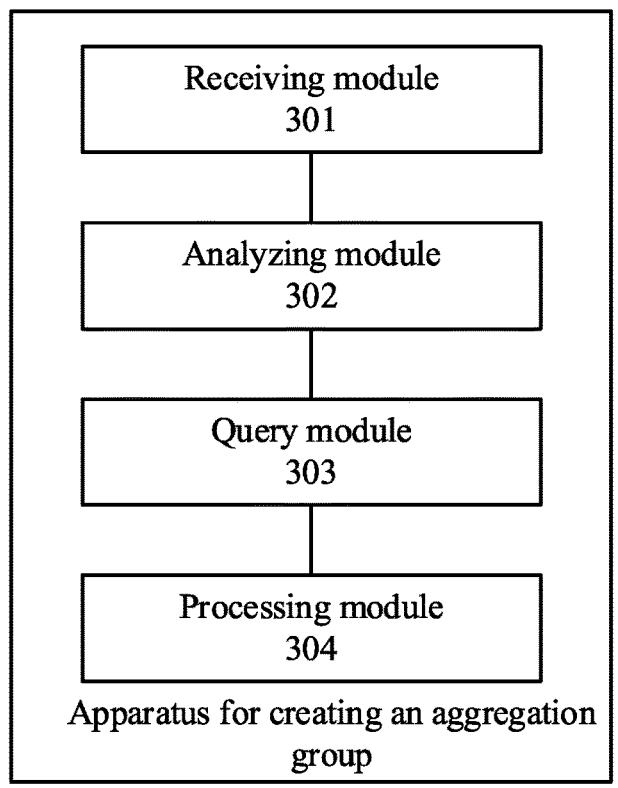
FIG. 3 is a structural diagram of an apparatus for creating an aggregation group according to an example of this disclosure.

Based on the same concept as the above method, in an example of this disclosure, an apparatus for creating an aggregation group is provided, which is applied to a CB device. FIG. 3 is a structural diagram of the device, and the device includes the following modules.

A receiving module 301 is configured to receive, through a first port, a packet sent by a PE device.

An analyzing module 302 is configured to analyze a unique identifier of the PE device from the packet.

A query module 303 is configured to query an array table when the first port is not included in any of aggregation groups.

A processing module 304 is configured to select an idle first aggregation group identifier when the unique identifier of the PE device does not exist in the array table, create a first aggregation group corresponding to the first aggregation group identifier, add the first port to the first aggregation group, and record a correspondence between the first aggregation group identifier and the unique identifier of the PE device in the array table.

A receiving module 301 is specifically configured to receive a packet through the first port, analyze a device type field from the packet, and determine that the packet received through the first port is sent from the PE device when the device type field is a preset value.

The query module 303 is further configured to query the array table in case that the first port is included in a second aggregation group. In this case, the processing module 304 is further configured to: in case that a unique identifier of a PE device corresponding to a second aggregation group identifier of the second aggregation group recorded in the array table is different from the unique identifier of the PE device analyzed from the packet, update the unique identifier of the PE device corresponding to the second aggregation group identifier in the array table into the unique identifier of the PE device analyzed from the packet.

In an example, the processing module 304 is further configured to obtain a third aggregation group identifier corresponding to the unique identifier of the PE device from the array table when the unique identifier of the PE device exists in the array table, and add the first port to a third aggregation group corresponding to the third aggregation group identifier.

In an example, the processing module 304 is further configured to, after the first aggregation group is created, select an idle PE number and assign the PE number to the PE device, and record a correspondence between the PE number and the first aggregation group identifier.

The packet includes an LLDP packet, and the unique identifier includes a MAC address of the PE device.

Figure 4:
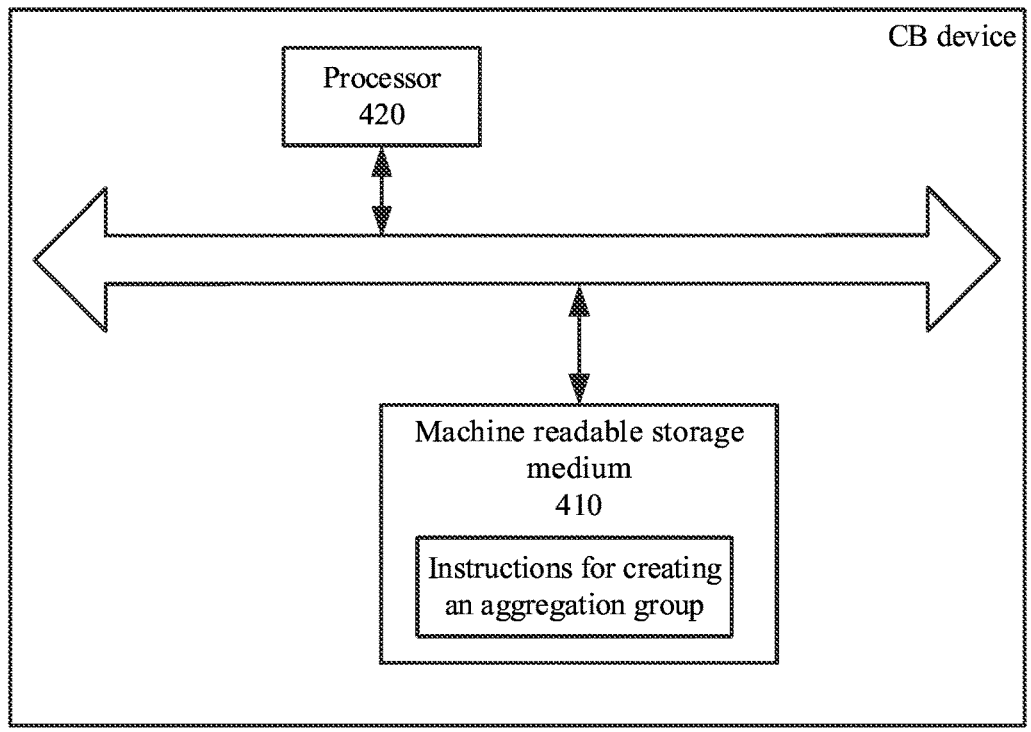
FIG. 4 is a hardware structural diagram of a CB device according to an example of this disclosure.

In examples of this disclosure, the hardware structure of the CB device can be specifically shown in FIG. 4. A machine readable storage medium 410 and a processor 420 are included, wherein:

Machine-readable storage medium 410 is configured to store instruction codes.

The processor 420 is configured to communicate with the machine readable storage medium 410, read and execute the instruction codes stored in the machine readable storage medium 410, and implements the operation of operating the aggregation group disclosed in the above example of this disclosure.

Here, machine-readable storage medium 410 can be any electronic, magnetic, optical, or other physical storage device that can contain or store information such as executable instructions, data, and the like. For example, a machine-readable storage medium can be a volatile memory, a non-volatile memory, or similar storage medium. Specifically, the machine-readable storage medium 410 may be a RAM (Random Access Memory), a flash memory, a storage drive (such as a hard disk drive), a solid state drive, any type of storage disk (such as a compact disc, a DVD, etc.) or the combination thereof.

The system, device, module or unit set forth in the above examples may be implemented by a computer chip or an entity, or by a product having a certain function. A typical implementation device is a computer, and the specific form of the computer may be a personal computer, a laptop computer, a cellular phone, a camera phone, a smart phone, a personal digital assistant, a media player, a navigation device, an email transceiver, a game control, a tablet, a wearable device, and any of these devices or a combination thereof.

For convenience of description, the above apparatus is functionally divided into each unit to be described separately. Of course, the functions of each unit may be implemented in a same/multiple software and/or hardware when implementing the present application.

Those skilled in the art will appreciate that embodiments of the present application can be provided as a method, system, or computer program product. Thus, the application can take the form of an entirely hardware embodiment, an entirely software embodiment, or a combination of software and hardware. Moreover, embodiments of the present application can take the form of a computer program product embodied on one or more computer usable storage media (including but not limited to disk storage, CD-ROM, optical storage, etc.) including computer usable program codes.

The present application is described with reference to flowcharts and/or block diagrams of methods, apparatus (systems), and computer program products according to examples of this disclosure. It will be understood that each of the flowcharts and/or block diagrams can be implemented by computer program instructions. These computer program instructions can be provided to a processor of a general purpose computer, special purpose computer, embedded processor, or other programmable data processing device to produce a machine for generating a means for implementing the functions specified in one or more flows of the flowchart or in a block or blocks of the block diagram by instructions executed by a processor of a computer or other programmable data processing device.

Moreover, these computer program instructions can also be stored in a computer readable memory that can direct a computer or other programmable data processing device to operate in a particular manner, such that the instructions stored in the computer readable memory produce an article of manufacture comprising the instruction device. The instruction device implements the functions specified in one or more flows of the flowchart or in one or more blocks of the block diagram.

These computer program instructions can also be loaded onto a computer or other programmable data processing device such that a series of operational steps are performed on a computer or other programmable device to produce computer-implemented processing. Thus, the instructions executed on a computer or other programmable device provide steps for implementing the functions specified in one or more flows of a flowchart and/or one or more blocks of a block diagram.

The foregoing disclosure is merely illustrative of the present application but not intended to limit the application. Various changes and modifications can be made to the present application by those skilled in the art. Any modifications, equivalents, improvements, etc. made within the spirit and scope of the present application shall be encompassed within the scope of the appended claims.

The invention claimed is:

1. A method for creating an aggregation group, including:
   receiving, by a controlling bridge (CB) device, through a first port, a packet sent from a port extender (PE) device;
   analyzing, by the CB device, a unique identifier of the PE device from the packet;
   querying, by the CB device, an array table when the first port is not included in any of aggregation groups;
   selecting, by the CB device, an idle first aggregation group identifier when the unique identifier of the PE device does not exist in the array table;
   creating, by the CB device, a first aggregation group corresponding to the first aggregation group identifier, adding the first port to the first aggregation group, and recording a correspondence between the first aggregation group identifier and the unique identifier of the PE device in the array table.

2. The method according to claim 1, wherein, receiving, through the first port, the packet sent from the PE device, comprises:
   receiving, by the CB device, the packet through the first port;
   analyzing, by the CB device, a device type field from the packet;
   determining, by the CB device, that the packet received through the first port is sent from the PE device when the device type field has a preset value.

3. The method of claim 2, wherein the method further comprises:
   the first port is further included in a second aggregation group,
   querying, by the CB device, the array table;
   in case that a unique identifier of a PE device corresponding to a second aggregation group identifier of the second aggregation group recorded in the array table is different from the unique identifier of the PE device analyzed from the packet,
   updating, by the CB device, the unique identifier of the PE device corresponding to the second aggregation group identifier in the array table into the unique identifier of the PE device analyzed from the packet.

4. The method of claim 1, wherein, the method further comprising:
   obtaining, by the CB device, a third aggregation group identifier corresponding to the unique identifier of the PE device from the array table when the unique identifier of the PE device exists in the array table;
   adding, by the CB device, the first port to a third aggregation group corresponding to the third aggregation group identifier.

5. The method of claim 1, wherein, after creating the first aggregation group corresponding to the first aggregation group identifier, the method further includes:
   selecting an idle PE number and assigning the idle PE number to the PE device;
   recording a correspondence between the idle PE number and the first aggregation group identifier.

6. The method of claim 1, wherein,
   the packet includes a Link Layer Discovery Protocol (LLDP) packet, and wherein
   the unique identifier includes a Media Access Control (MAC) address of the PE device.

7. An apparatus for creating an aggregation group, applied to a controlling bridge (CB) device, comprising:
   a non-transitory machine readable storage medium storing machine executable instructions;
   a processor for executing the machine executable instructions to
   receive, through a first port of the CB device, a packet sent from a port extender (PE) device;
   analyze a unique identifier of the PE device from the packet;
   query an array table when the first port is not included in any of aggregation groups;
   select an idle first aggregation group identifier when the unique identifier of the PE device does not exist in the array table;
   create a first aggregation group corresponding to the first aggregation group identifier, add the first port to the first aggregation group, and record a correspondence between the first aggregation group identifier and the unique identifier of PE device in the array table.

8. The apparatus of claim 7, wherein, when receiving, through the first port, the packet sent from the PE device, the processor is further caused by the machine executable instructions to:
   receive a packet through the first port;
   analyze a device type field from the packet;
   determine that the packet received through the first port is sent from the PE device when the device type field has a preset value.

9. The apparatus of claim 8, wherein the processor is further caused by the machine executable instructions to:
   in case that the first port is included in a second aggregation group,
   query the array table;
   in case that a unique identifier of a PE device corresponding to a second aggregation group identifier of the second aggregation group recorded in the array table is different from the unique identifier of the PE device analyzed from the packet,
   update the unique identifier of the PE device corresponding to the second aggregation group identifier in the array table into the unique identifier of the PE device analyzed from the packet.

10. The apparatus of claim 7, wherein, the processor is further caused by the machine executable instructions to:
    obtain a third aggregation group identifier corresponding to the unique identifier of the PE device from the array table when the unique identifier of the PE device exists in the array table;
    add the first port to a third aggregation group corresponding to the third aggregation group identifier.

11. The apparatus of claim 7, wherein, after creating the first aggregation group corresponding to the first aggregation group identifier, the processor is further caused by the machine executable instructions to:
    select an idle PE number and assigning the idle PE number to the PE device;
    record a correspondence between the idle PE number and the first aggregation group identifier.

12. The apparatus of claim 7, wherein,
    the packet includes a Link Layer Discovery Protocol (LLDP) packet, and wherein
    the unique identifier includes a Media Access Control (MAC) address of the PE device.

* * * * *